United States Patent [19]
Mok

[11] Patent Number: 6,008,986
[45] Date of Patent: Dec. 28, 1999

[54] LAPTOP COMPUTER WITH SLIDABLE KEYBOARD FOR EXPOSING A HEAT GENERATING SURFACE FOR MORE EFFICIENT HEAT DISSIPATION

[75] Inventor: Lawrence Shungwei Mok, Brewster, N.Y.

[73] Assignee: International Business Machines Corporation, Armonk, N.Y.

[21] Appl. No.: 08/903,162

[22] Filed: Jul. 30, 1997

[51] Int. Cl.[6] ............................. G06F 1/16; G06F 1/20; H05K 7/20
[52] U.S. Cl. ............................. 361/687; 361/680
[58] Field of Search ................... 361/680, 687; 400/682, 691, 714; 364/781

[56] References Cited

U.S. PATENT DOCUMENTS

| | | | |
|---|---|---|---|
| 5,490,037 | 2/1996 | Clancy | 361/680 |
| 5,539,615 | 7/1996 | Sellers | 361/680 |
| 5,557,500 | 9/1996 | Baucom et al. | 361/687 |
| 5,588,483 | 12/1996 | Ishida | 361/687 |
| 5,629,832 | 5/1997 | Sellers | 361/680 |
| 5,635,928 | 6/1997 | Takagi et al. | 400/682 |
| 5,706,167 | 1/1998 | Lee | 400/682 |
| 5,757,615 | 5/1998 | Donahoe et al. | 361/687 |
| 5,764,474 | 6/1998 | Youens | 361/680 |
| 5,796,578 | 8/1998 | Jones | 361/687 |
| 5,805,417 | 9/1998 | Nakagawa et al. | 361/687 |
| 5,818,360 | 10/1998 | Chu et al. | 361/680 |

OTHER PUBLICATIONS

Albert Yu, "The Future of Microprocessors", *IEEE Micro*, Dec. 1996, pp. 46–53.

*Primary Examiner*—Lynn D. Feild
*Assistant Examiner*—Lisa Lea-Edmonds
*Attorney, Agent, or Firm*—Scully, Scott, Murphy & Presser; Daniel P. Morris, Esq.

[57] ABSTRACT

An arrangement and method for increasing the cooling capacity and heat dissipation of laptop computers, wherein the computer possesses a bottom keyboard which is articulated to the lower edge of an openable (LCD) display panel, and wherein at least components of the electronics are housed in the keyboard housing. The keyboard is adapted to be slid outwardly at least partially from the computer keyboard housing in which the keyboard is normally arranged, such that heat can be more readily and directly dispensed to the surroundings. The keyboard is concurrently tilted upwardly at the end distant from a user so as to provide an increased surface area for the enhanced cooling of the electronic components which are normally housed beneath the keyboard.

10 Claims, 3 Drawing Sheets

LAPTOP COMPUTER WITH SLIDABLE KEYBOARD FOR EXPOSING A HEAT GENERATING SURFACE FOR MORE EFFICIENT HEAT DISSIPATION

BACKGROUND OF THE INVENTION

The present invention relates to an arrangement for enhancing the cooling capacity of portable personal computers. More particularly, the invention is directed to the provision of an arrangement or device for increasing the cooling capacity and heat dissipation of laptop computers, wherein the computer possesses a bottom keyboard which is articulated to the lower edge of an openable (LCD) display panel, and wherein at least components of the electronics are housed in the keyboard housing.

The capacity and performance of portable personal computers, such as laptop computers, notebook computers or the like, has recently been enhanced to such an extent that; for example, since the beginning of 1996, the thermal dissipation requirements of portable personal computers (PCs) have increased from about 10 watts to 20 watts and even higher values. This increase in the thermal dissipation requirements is a result of ever increasing CPU performance and additional functionality; such as DVD, modem, audio and the like, which are provided by future PCs. As elucidated in an article by Albert Yu, "The Future of Microprocessors", IEEE Micro, December 1996, pages 46 through 53, the trend of increasing power dissipation in the form of heat for portable personal computers will continue in the foreseeable future. Thus, at the widely employed A4 form factor for a portable personal computer; for instance, the cooling limit for a portable PC without a cooling fan is currently approximately 15 to 20 watts. Thus, providing a greater cooling capacity than the current limits in order to meet the anticipated thermal dissipation requirements of future portable personal computers, represents not only a potential competitive advantage in industry, but also provides a significant product differentiation from currently available and commercially sold portable personal computers.

In particular with regard to the power consumption of laptop computers, there has been recently a continued increase in the power of the CPU. For example, the total of power of a laptop computer is normally about 10 watts, and has now increased to a range of about 30 to 40 watts or higher, whereas the CPU power has been increased from about 2 to 6 watts and, conceivably, can be as high as in the 10 watts range. Most of this power will eventually be dissipated in the form of heat to the surroundings. Consequently, being able to remove increased amounts of heat from the laptop computer becomes a critical factor in the construction and operation of such laptop computers.

SUMMARY OF THE INVENTION

In order to increase the cooling capacity of portable personal computers, in effect, to provide for power dissipation in the form of heat, and particularly for laptop computers, the present invention is directed to a structure in which the keyboard is adapted to be slid outwardly at least partially from the computer keyboard housing in which the keyboard is normally arranged, such that heat can be more readily and directly dispensed to the surroundings. In the case of the use of an air moving device, such as a cooling fan installed in the laptop computer, the exposed surface area which is obtained through the outward displacement of the keyboard may comprise either the inlet or outlet of the air moving device or fan.

Accordingly, it is an object of the present invention to provide an arrangement in a laptop computer which will enhance the cooling capacity of the computer through an outward displacement of the keyboard relative to its housing in the computer.

A more specific object resides in the provision of structure for enhancing the cooling capacity of a laptop computer wherein the keyboard is adapted to be shifted outwardly of the housing to a predetermined extent and concurrently tilted upwardly at the end distant from a user so as to provide an increased surface area for the enhanced cooling of the electronic components which are normally housed beneath the keyboard.

Further advantages of the invention may now be more readily ascertained from the following detailed description of preferred embodiments thereof, taken in conjunction with the accompanying drawings; in which.

DETAILED DESCRIPTION OF PREFERRED EMBODIMENTS

Figure 1:
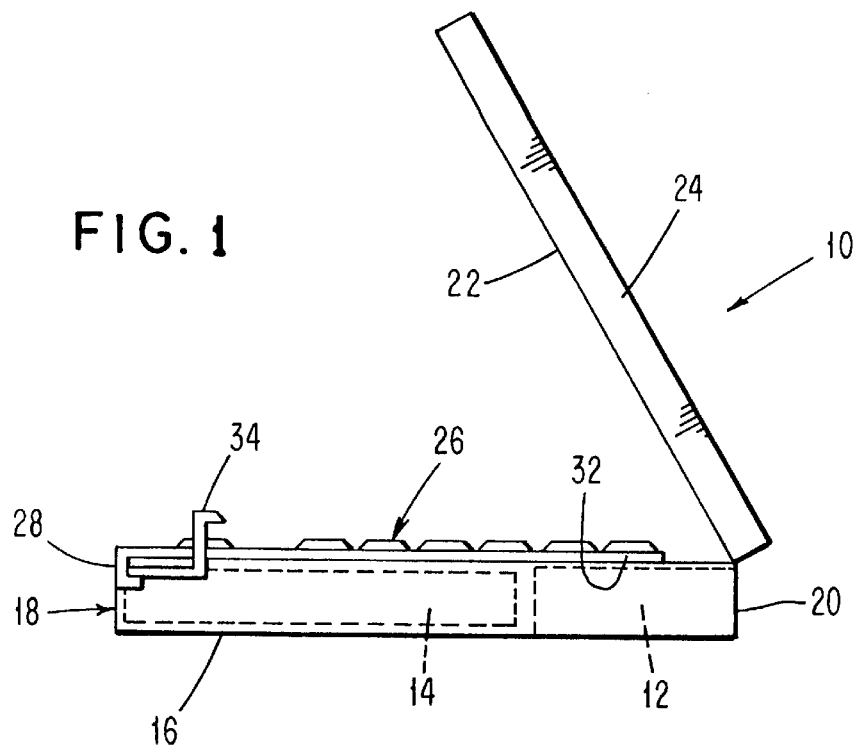
FIG. 1 illustrates, generally diagrammatically, a side elevational view of a laptop computer incorporating a manually operated sliding keyboard, and showing the keyboard in the rest position.

Referring to FIG. 1, the laptop computer 10 has a logic complex 12 and peripheral components 14 such as a hard drive, CD-ROM drive, and battery stored in the lower portion 16 of the computer housing 18. In general, the logic complex 12 is encompassed by a metal cage 20 and the heat generated from the logic components inside the complex is conducted out to the metal cage 20. A display, such as liquid-crystal display 22 is placed in the upper housing portion or display panel 24 of the computer housing 18.

Figure 2:
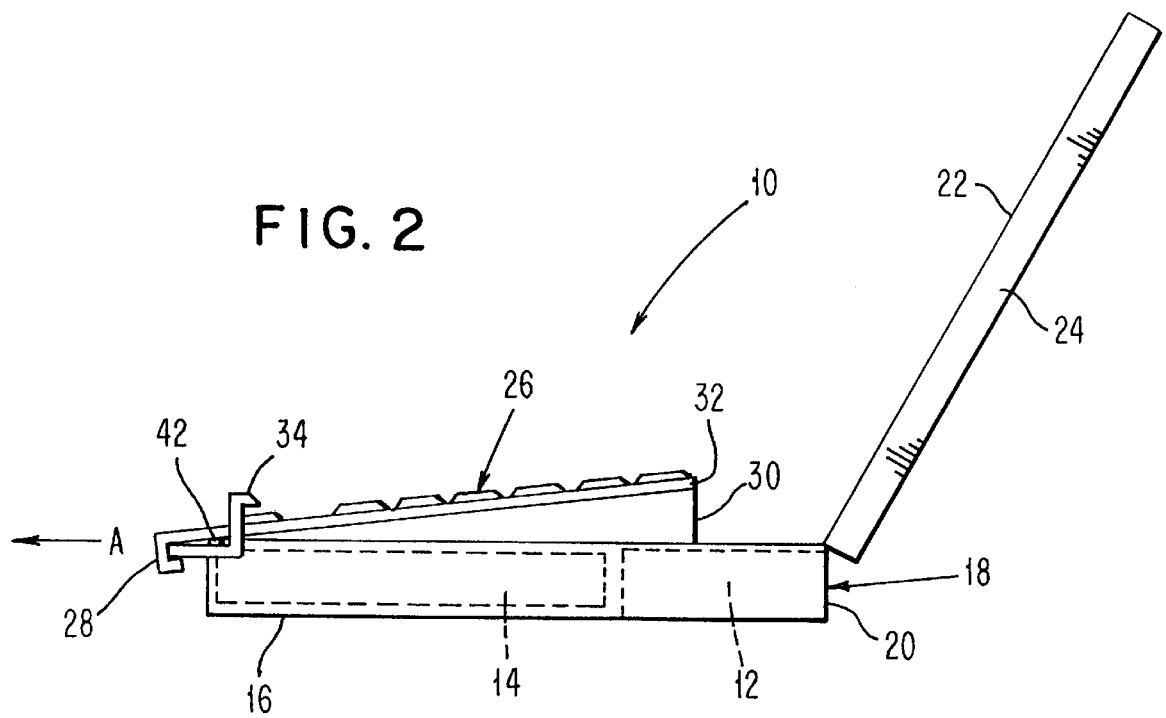
FIG. 2 illustrates a side view of the laptop computer of FIG. 1 with the keyboard being displaced outwardly and tilted upwardly, and the display panel being in the fully opened position.

A keyboard 26 is placed on top of the lower portion 16 of the computer housing 18. When the keyboard 26 is in the rest position, a tail piece 28 is inserted into a snap-on type of fastener which is well known and is not shown in the figure. Upon the keyboard 26 being pulled out from the fastener in the direction of arrow A, a mechanical link 30 on the opposite end 32 of the keyboard 26 will tilt the keyboard 26 up, as shown in FIG. 2. The keyboard 26 is supported in this tilted position by the mechanical link 30 and guided by a latch 34 on both sides of the laptop computer when it is slid outwardly from the rest position.

Figure 3:
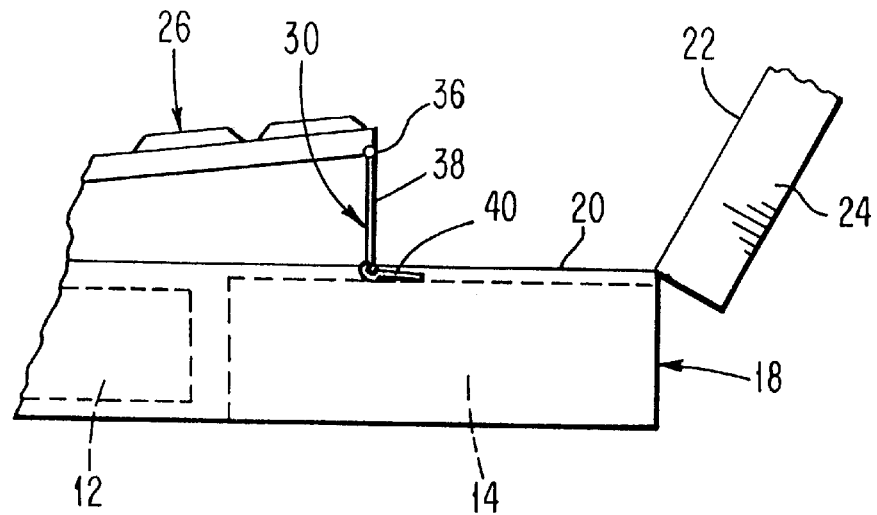
FIG. 3 illustrates a fragmentary side view, on an enlarged scale, of the mechanical linkage for displacement of the manually operated sliding keyboard of FIG. 1.

FIG. 3 illustrates the details of the mechanical link 30, which comprises a hinge 36, a support plate 38, and clip 40. The hinge 36 is mounted on the back side of the keyboard 26, and the clip 40 is mounted on upper surface of the metal cage 20 for the logic complex 12. When the keyboard 26 is slid outwardly, the support plate 38 will be forced first into the clip 40 and then pivoted at that point so as to raise the keyboard 26 until a stop 42 which is located on the lower side of the keyboard 26 strikes against front wall of the lower portion 16 of the computer housing 18 as shown in FIG. 2. Preferably, the mechanical link 30 should consists of thermally conductive materials, such as aluminum. In this manner, a portion of the heat generated by the logic complex 12 can be conducted to the keyboard 26 and dissipated through the keyboard 26.

The open area between the mechanical link 30 and the upper portion 24 of the computer housing 18 is now exposed to the open air, and heat generated from the logic complex 12 can be dissipated directly to the open air or surroundings. Since most of the heat generated by the computer 10 is concentrated within the logic complex 12, it is more efficient to cool the computer this way by exposing the metal cage 20 of the logic complex 12 to an open air. Heat is now dissipated to the open air by natural convection and radiation. In case more cooling capability is needed, a cooling fan (not shown) can be added to the logic complex 12 and the exposed surface area can serve as either an inlet or outlet of the cooling fan. In order to avoid any human beings touching the hot surface, some kind of protective grille may be placed on the exposed surface.

Figure 4:
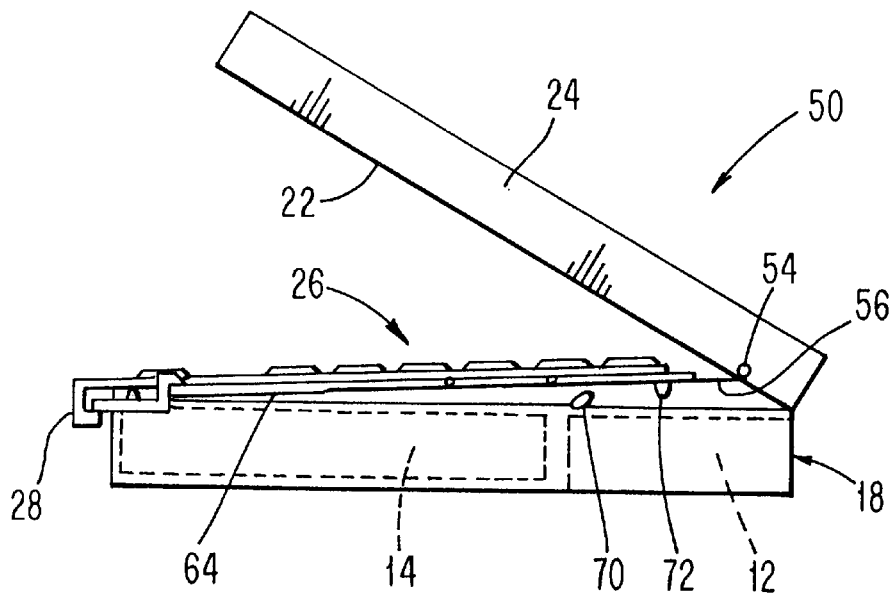
FIG. 4 illustrates a second embodiment of a laptop computer, in a side elevational view, with an automated sliding keyboard, illustrating the display panel in a partly open condition.
Figure 5:
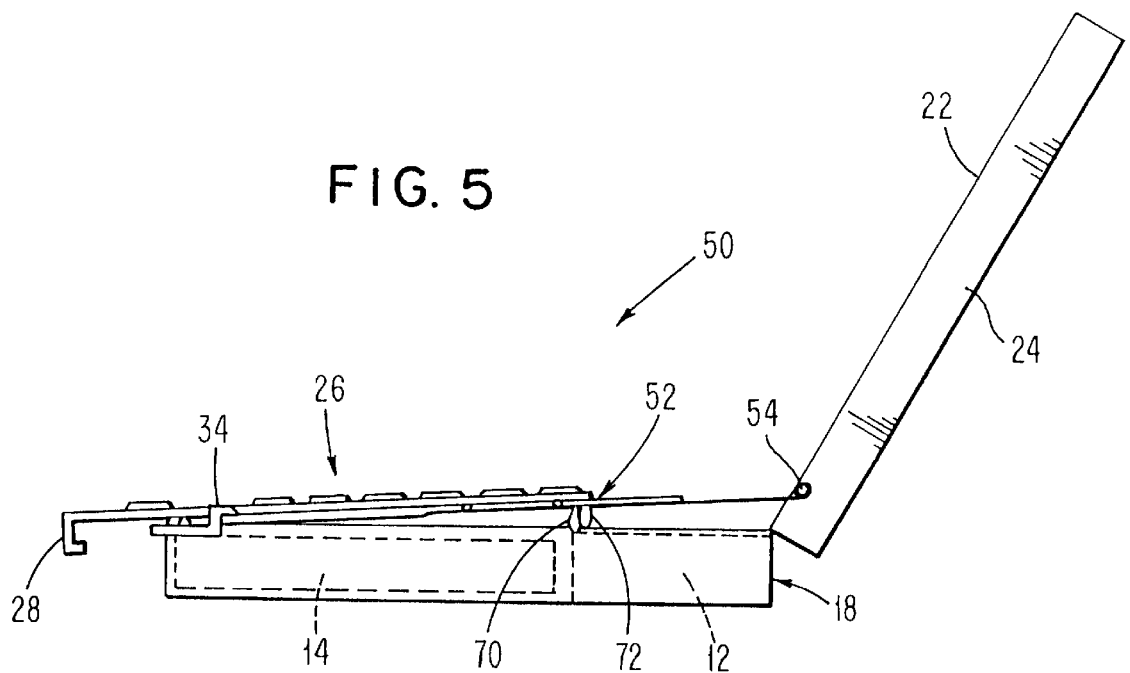
FIG. 5 illustrates a side view of the laptop computer of FIG. 4 with the display panel being in a fully opened position.
Figure 6:
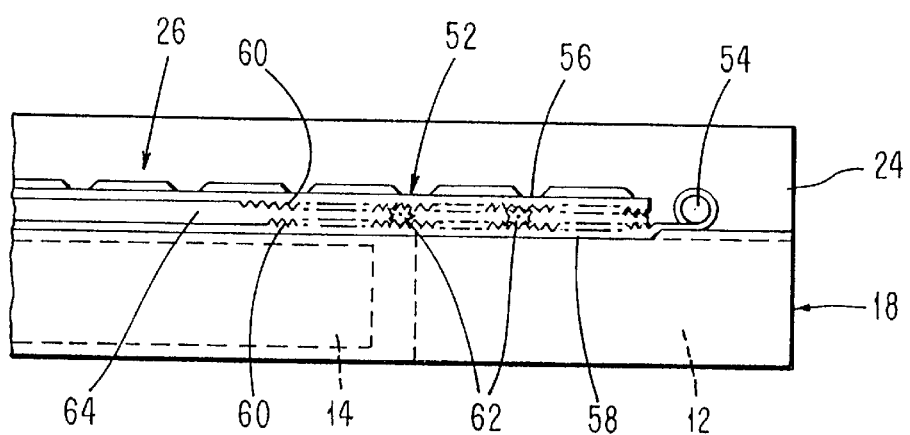
FIG. 6 illustrates an enlarged a fragmentary detail of the mechanical arrangement of the automated sliding keyboard of FIG. 4.

Another embodiment, as disclosed in FIGS. 4 to 6, in which elements which are identical with or similar to those in FIGS. 1 to 3 are identified by the same reference numerals, sets forth a laptop computer 50 in which an automated sliding mechanism 52 is employed to pull the keyboard 26 out and tilt it in accordance with the opening and closing of the laptop computer.

FIG. 4 illustrates a side view of this automated sliding mechanism 52 when the laptop computer 50 is partially open. One end of the automated sliding mechanism 52 is connected to the upper portion or display panel 24 of the computer housing 18 by means of a hinge-like structure 54. The other end of the automated sliding mechanism is attached to the front wall of the lower portion 16 of the computer housing 18 by means of another similar hinge-like structure (not shown). Provided are two such automated sliding mechanisms 52; one being mounted on the left-hand side of the keyboard 26 and the other on the right-hand side.

As shown in the detail drawing of FIG. 6, two bars 56,58 housed within a sheath 64. The lower bar 58 is connected to the hinge 54 and the upper bar 56 is mounted on the keyboard 26. Both bars possess gear teeth 60. Two pinions or gears 62 are arranged between the two bars 56,58, and the axes of the gears 62 are located on the sheath 64.

When the laptop computer 50 is swung open, as shown in FIGS. 4 and 5, the lower bar 56 is pulled towards the rear of the computer 50. This movement of the lower bar 56 rotates the gears 62 counter-clockwise and forces the upper bar 56 to move towards the front of the computer. As a result, the keyboard 26 is slid outwardly towards the front and concurrently tilted upwardly. When the upper portion or display panel 24 of the computer housing 18 is swung closed or downwardly, an opposite movement of the mechanism takes place, and the keyboard 26 automatically moves back into the rest position. In order to conduct a portion of the heat: from the logic complex 12 to the keyboard 26 when the keyboard 26 is slid outwardly, two tubes 70,72 of elliptical cross-sections are used to construct a thermal bridge between the keyboard 26 and the logic complex 12 as shown in FIG. 5. Both tubes 70,72 are made of thermally conductive, flexible, spring-like materials, such as beryllium copper. The upper tube 70 is mounted at the rear side of the keyboard 26 which has a thermally conductive material such as aluminum as a base plate. The lower tube 72 is mounted on the upper surface of the logic complex 12. When the keyboard 26 is in the rest position, or the display panel 24 is closed, the tubes 70 and 72 are collapsed. When the keyboard 26 is slid outwardly and tilted up, the tubes 70 and 72 spring out and are forced into good contact as shown in FIG. 5. A portion of the heat generated by the logic complex 12 can now be transferred to the keyboard 26 and the surroundings through these two metal tubes. Again, if more cooling capability is needed, the exposed area on the logic complex 12 can be used as the inlet or outlet of a cooling fan (not shown) which is located inside the logic complex. A protective grille may be placed on the exposed surface to form a protection against accidental touching by users.

While there has been shown and described what are considered to be preferred embodiments of the invention, it will, of course, be understood that various modifications and changes in form or detail could readily be made without departing from the spirit of the invention. It is, therefore, intended that the invention be not limited to the exact form and detail herein shown and described, nor to anything less than the whole of the invention herein disclosed as hereinafter claimed.

Having thus described our invention, what I claim as new, and desire to secure by Letters Patent is:

1. An arrangement for enhancing the cooling capacity of a computer having a bottom housing containing at least one electronic component generating heat during operation of said computer, a keyboard supported on said housing; and a display panel hingedly connected proximate a rear edge of said housing and being pivotable between a folded down closed position and upwardly raised open positions; said arrangement comprising means for sliding said keyboard forwardly on said housing and concurrently tilting the keyboard upwardly to a predetermined forwardly displaced and angular elevation upon the raising of said display panel so as to provide an increased surface area about said at least one electronic component for dissipating the generated heat directly to the surroundings, said keyboard sliding and tilting means including a sliding mechanism which is automatically actuated upon raising of the display panel from a closed position into an opening position, said sliding mechanism comprising a sheath housing mutually displaceable parallel extending upper and lower bars; gear means mounted on said sheath and being interposed between said bars so as to engage toothed gear rack surfaces on said bars, said upper bar being fastened to a bottom surface of said keyboard, said lower bar having an extension arm journaled to said display panel displaces said lower bar to tilt said keyboard angularly upwardly while concurrently causing said lower bar to rotate said gears and sliding the upper bar and the therewith attached keyboard forwardly and outwardly relative to the housing.

2. An arrangement as claimed in claim 1, wherein closing of said display panel causes said lower bar to move forwardly so as to lower the keyboard into the housing while concurrently retracting the upper bar and attached keyboard rearwardly into the housing confines responsive to said gears rotating on said gear rods for telescoping said upper and lower bars.

3. An arrangement as claimed in claim 1, wherein collapsible tubes are interposed between the bottom of said keyboard and said housing to form a thermal bridge in the opened position of said display panel for dissipating at least a part of the heat generated by said at least one electronic component.

4. An arrangement as claimed in claim 3, wherein said tubes are each elliptical in transverse cross-section and are formed from a thermally-conductive, flexible spring-like material.

5. An arrangement as claimed in claim 4, wherein the material of said tubes comprises beryllium copper.

6. A method of enhancing the cooling capacity of a computer having a bottom housing containing at least one electronic component generating heat during operation of said computer, a keyboard supported on said housing; and a display panel hingedly connected proximate a rear edge of said housing and being pivotable between a folded down closed position and upwardly raised open positions; said method comprising sliding said keyboard forwardly on said housing and concurrently tilting the keyboard upwardly to a predetermined forwardly displaced and angular elevation upon the raising of said display panel so as to provide an increased surface area about said at least one electronic component for dissipating the generated heat directly to the surroundings, said keyboard sliding and tilting being effected through a sliding mechanism which is automatically actuated upon raising of the display panel from a closed position into an opening position, said sliding mechanism including a sheath housing mutually displaceable parallel spaced upper and lower bars; gear means mounted on said sheath between said bars and being interposed therebetween for engaging toothed gear rack surfaces on said bars, said upper bar being fastened to a bottom surface of said keyboard, said lower bar having an extension arm journaled to said display panel whereby raising of said display panel displaces said lower bar to tilt said keyboard while concurrently causing said lower bar to rotate said gears and sliding the upper bar and the therewith attached keyboard forwardly and outwardly relative to the housing.

7. A method as claimed in claim 6, wherein the closing of said display panel causes said lower bar to move forwardly so as to lower the keyboard into the housing while concurrently retracting the upper bar and attached keyboard into the housing confines responsive to said gears causing said gear rods telescoping said upper and lower bars.

8. A method as claimed in claim 6, wherein collapsible tubes are interposed between the bottom of said keyboard and said housing to form a thermal bridge in the opened position of said display panel for dissipating at least a part of the heat generated by said at least one electronic component.

9. A method as claimed in claim 8, wherein said tubes are each elliptical in transverse cross-section and are formed from a thermally-conductive, flexible spring-like material.

10. A method as claimed in claim 9, wherein the material of said tubes comprises beryllium copper.

\* \* \* \* \*